(12) United States Patent
Shen et al.

(10) Patent No.: US 11,106,193 B1
(45) Date of Patent: Aug. 31, 2021

(54) NEURAL NETWORK-BASED ERROR COMPENSATION METHOD, SYSTEM AND DEVICE FOR 3D PRINTING

(71) Applicants: INSTITUTE OF AUTOMATION, CHINESE ACADEMY OF SCIENCES, Beijing (CN); BEIJING TEN DIMENSIONS TECHNOLOGY CO., LTD., Beijing (CN)

(72) Inventors: Zhen Shen, Beijing (CN); Gang Xiong, Beijing (CN); Yuqing Li, Beijing (CN); Hang Gao, Beijing (CN); Yi Xie, Beijing (CN); Meihua Zhao, Beijing (CN); Chao Guo, Beijing (CN); Xiuqin Shang, Beijing (CN); Xisong Dong, Beijing (CN); Zhengpeng Wu, Beijing (CN); Li Wan, Beijing (CN); Feiyue Wang, Beijing (CN)

(73) Assignees: INSTITUTE OF AUTOMATION, CHINESE ACADEMY OF SCIENCES, Beijing (CN); BEIJING TEN DIMENSIONS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/258,748

(22) PCT Filed: Sep. 16, 2019

(86) PCT No.: PCT/CN2019/105963
§ 371 (c)(1),
(2) Date: Jan. 8, 2021

(87) PCT Pub. No.: WO2020/140477
PCT Pub. Date: Jul. 9, 2020

(30) Foreign Application Priority Data

Jan. 3, 2019 (CN) .......................... 201910005702.1

(51) Int. Cl.
*G05B 19/4099* (2006.01)
*G05B 19/404* (2006.01)
*G06N 3/08* (2006.01)

(52) U.S. Cl.
CPC ....... *G05B 19/4099* (2013.01); *G05B 19/404* (2013.01); *G06N 3/08* (2013.01); *G05B 2219/49023* (2013.01)

(58) Field of Classification Search
None
See application file for complete search history.

(56) References Cited

U.S. PATENT DOCUMENTS

| 2016/0046076 A1* | 2/2016 | Huang | B29C 64/129 |
| | | | 700/98 |
| 2016/0203241 A1* | 7/2016 | Dean | A61F 2/30942 |
| | | | 700/118 |

FOREIGN PATENT DOCUMENTS

| CN | 105058795 A | 11/2015 |
| CN | 105965886 A | 9/2016 |

(Continued)

*Primary Examiner* — Mohammad Ali
*Assistant Examiner* — Saad M Kabir
(74) *Attorney, Agent, or Firm* — Bayramoglu Law Offices LLC (57) ABSTRACT

A neural network-based error compensation method for 3D printing includes: compensating an input model by a deformation network/inverse deformation network constructed and trained according to a 3D printing deformation function/inverse deformation function, and performing the 3D printing based on the compensated model. Training samples of the deformation network/inverse deformation network include to-be-printed model samples and printed model samples. The deformation network constructed according to the 3D printing deformation function is marked as a first network. During training of the first network, the to-be-printed model samples are used as real input models, and the (Continued)

printed model samples are used as real output models. The inverse deformation network constructed according to the 3D printing inverse deformation function is marked as a second network. During training of the second network, the printed model samples are used as real input models, and the to-be-printed model samples are used as real output models.

20 Claims, 3 Drawing Sheets

(56) References Cited

FOREIGN PATENT DOCUMENTS

| | | |
|---|---|---|
| CN | 107886167 A | 4/2018 |
| CN | 108995220 A | 12/2018 |
| CN | 109808183 A | 5/2019 |
| EP | 3282682 A1 | 2/2018 |
| WO | 2018088965 A1 | 5/2018 |

* cited by examiner

NEURAL NETWORK-BASED ERROR COMPENSATION METHOD, SYSTEM AND DEVICE FOR 3D PRINTING

CROSS REFERENCE TO THE RELATED APPLICATIONS

This application is the national phase entry of International Application No. PCT/CN2019/105963, filed on Sep. 16, 2019, which is based upon and claims priority to Chinese Patent Application No. 201910005702.1, filed on Jan. 3, 2019, the entire contents of which are incorporated herein by reference.

TECHNICAL FIELD

The present invention pertains to the field of three-dimensional (3D) printing, and more particularly, relates to a neural network-based error compensation method, system and device for 3D printing.

BACKGROUND 3D printing is typically a cyber-physical system (CPS) and has been rapidly developed in recent years. There is, therefore, an increased demand of mass customization for 3D printing. Compared with traditional methods, however, 3D printing technologies in the prior art generally have low precision when building objects, and thus cannot reach the optimal level to meet demands in some cases such as printing of dental crowns. Currently, commercial 3D printers have positioning precision of tens or hundreds of microns, but generally have a larger error when building objects. This is because, processes including heating, cooling, bonding and polymerization usually occur in the 3D printing process, which cause shrinkage and warpage of the printed objects. Moreover, 3D printing has been advanced in recent years and there are more and more demands for customization. The shapes are various and the quantity is usually not large, while the deformation is affected by the shape. In such cases, manual error compensation is neither easy nor economical.

Error compensation is generally achieved by the finite element method (FEM). When the finite element method is applied, considerations should be given to not only the properties of the printed material but also the printing process. In this regard, it is difficult to apply the finite element method to an arbitrarily given model. In view of the above-mentioned issues, it is imperative to develop a universal error compensation method for 3D printing.

SUMMARY

In order to solve the above-mentioned problems in the prior art, that is, to solve the problem of difficulties in performing error compensation on a new model in the 3D printing process, the first aspect of the present invention provides a neural network-based error compensation method for 3D printing, including: compensating an input model by a trained deformation network/inverse deformation network, and performing the 3D printing based on the compensated model.

The deformation network/inverse deformation network is constructed according to a 3D printing deformation function/3D printing inverse deformation function. The training samples of the deformation network/inverse deformation network include to-be-printed model samples and printed model samples during the 3D printing.

The deformation network constructed according to the 3D printing deformation function is marked as a first network. Output models obtained after the to-be-printed model samples in the training samples pass through the deformation network are used as expected output models. During training of the first network, the to-be-printed model samples are used as real input models, and the printed model samples are used as real output models.

The inverse deformation network constructed according to the 3D printing inverse deformation function is marked as a second network. Output models obtained after the printed model samples in the training samples pass through the inverse deformation network are used as expected output models. During training of the second network, the printed model samples are used as real input models, and the to-be-printed model samples are used as real output models.

In some preferred embodiments, the neural network-based error compensation method for 3D printing further includes the following steps of selecting the deformation network/inverse deformation network:

constructing a plurality of deformation networks/inverse deformation networks structured by the neural network;

training the plurality of the deformation networks/inverse deformation networks based on a preset loss function, respectively, to obtain a plurality of trained deformation networks/inverse deformation networks;

based on a preset learning performance index set, obtaining learning performance index values of each of the trained deformation networks/inverse deformation networks, respectively, to obtain a learning performance index value set of each of the trained deformation networks/inverse deformation networks; and selecting the learning performance index value set, and using a trained deformation network/inverse deformation network corresponding to the learning performance index value set as the selected deformation network/inverse deformation network.

In some preferred embodiments, the "preset learning performance index set" is constructed based on the variables of $TP_i$, $TN_i$, $FP_i$, and $FN_i$, wherein, i denotes an $i^{th}$ 3D model sample in a 3D model sample set used in "the steps of selecting the deformation network/inverse deformation network";

$TP_i$ denotes a true positive value of the $i^{th}$ 3D model sample, wherein the true positive value of the $i^{th}$ 3D model sample is equal to the number of voxels with a real output of 1 and an expected output of 1 in the 3D model sample;

$TN_i$ denotes a true negative value of the $i^{th}$ 3D model, wherein the true negative value of the $i^{th}$ 3D model sample is equal to the number of voxels with a real output of 0 and an expected output of 0 in the 3D model sample;

$FP_i$ denotes a false positive value of the $i^{th}$ 3D model, wherein the false positive value of the $i^{th}$ 3D model sample is equal to the number of voxels with the real output of 1 and the expected output of 0 in the 3D model sample;

$FN_i$ denotes a false negative value of the $i^{th}$ 3D model, wherein the false negative value of the $i^{th}$ 3D model sample is equal to the number of voxels with the real output of 0 and the expected output of 1 in the 3D model sample.

In some preferred embodiments, the "preset learning performance index set" includes at least one selected from the group consisting of Precision, Recall, F1, Accuracy, $Accuracy_i$, and $Accuracy_{i,white}$, wherein, $$Precision = \frac{\sum_{i=0}^{N-1} TP_i}{\sum_{i=0}^{N-1} TP_i + \sum_{i=0}^{N-1} FP_i}$$

$$Recall = \frac{\sum_{i=0}^{N-1} TP_i}{\sum_{i=0}^{N-1} TP_i + \sum_{i=0}^{N-1} FN_i}$$

$$F1 = \frac{2 \cdot Precision \cdot Recall}{Precision + Recall} = \frac{2 \cdot \sum_{i=0}^{N-1} TP_i}{2 \cdot \sum_{i=0}^{N-1} TP_i + \sum_{i=0}^{N-1} FN_i + \sum_{i=0}^{N-1} FP_i}$$

$$Accuracy = \frac{1}{M \cdot N} \sum_{i=0}^{N-1} (TP_i + TN_i)$$

$$Accuracy_i = \frac{1}{M}(TP_i + TN_i)$$

$$Accuracy_{i,white} = \frac{TP_i}{TP_i + FN_i}$$

where, Precision denotes precision, Recall denotes a recall rate, F1 denotes the harmonic mean of the precision and the recall rate, Accuracy denotes an accuracy rate, $Accuracy_i$ denotes an accuracy rate of the $i^{th}$ 3D model sample, $Accuracy_{i,white}$ denotes an accuracy rate of voxels in the $i^{th}$ 3D model sample, N denotes the number of 3D model samples in the 3D model sample set, and M denotes the number of voxels in the 3D model sample.

In some preferred embodiments, the loss function L for training the deformation network/inverse deformation network is expressed by the following formula:

$$L = \sum_{i=0}^{M-1} [-a y_i \log(y'_i) - (1-a)(1-y_i) \log(1 - y'_i)]$$

where, M denotes the number of voxels of the expected output model during training; a denotes a preset penalty coefficient, and $a \in [0,1]$; $y_i$ denotes a true probability that an $i^{th}$ voxel grid in the expected output model is occupied, and a value of $y_i$ is 0 or 1; $y'_i$ denotes a probability that the $i^{th}$ voxel grid is occupied, wherein the probability that the $i^{th}$ voxel grid is occupied is predicted by the neural network, and a value of $y'_i$ is between 0 and 1.

In some preferred embodiments, the training samples of the deformation network/inverse deformation network are 3D model data or two-dimensional slice data of the 3D model.

In some preferred embodiments, output model samples of the training samples of the deformation network/inverse deformation network are obtained based on a 3D printed physical model or generated based on a simulation method.

According to the second aspect of the present invention, a neural network-based error compensation system for 3D printing is provided, including an input module, a compensation module, and an output module.

The input module is configured to obtain an input model.

The compensation module includes a trained deformation network/inverse deformation network based on a neural network and is configured to compensate the input model and generate a compensated input model.

The output module is configured to output the compensated input model.

The deformation network/inverse deformation network is constructed according to the 3D printing deformation function/3D printing inverse deformation function. The training samples of the deformation network/inverse deformation network include to-be-printed model samples and printed model samples during the 3D printing.

The deformation network constructed according to the 3D printing deformation function is marked as the first network. Output models obtained after the to-be-printed model samples in the training samples pass through the deformation network are used as expected output models. During training of the first network, the to-be-printed model samples are used as real input models, and the printed model samples are used as real output models.

The inverse deformation network constructed according to the 3D printing inverse deformation function is marked as a second network. Output models obtained after the printed model samples in the training samples pass through the inverse deformation network are used as expected output models. During training of the second network, the printed model samples are used as the real input models, and the to-be-printed model samples are used as the real output models.

According to the third aspect of the present invention, a storage device is provided, wherein a plurality of programs are stored in the storage device, and the plurality of programs are loaded and executed by a processor to achieve the neural network-based error compensation method for 3D printing described above.

According to the fourth aspect of the present invention, a processing device is provided, including a processor and a storage device. The processor is configured to execute a plurality of programs. The storage device is configured to store the plurality of programs. The plurality of programs are loaded and executed by the processor to achieve the neural network-based error compensation method for 3D printing described above.

According to the fifth aspect of the present invention, a 3D printing device is provided, including a control unit. The control unit is configured to load and execute a plurality of programs to perform an error compensation on the input model by the neural network-based error compensation method for 3D printing described above during the 3D printing.

The advantages of the present invention are as follows.

Precision of 3D printing is improved in the present invention. Moreover, compared with the existing finite element method, the error compensation is accomplished without considering factors such as printing processes and types of employed materials that would affect the printing deformation. The present invention is combined with the neural network in the computer and directed to the method of training the deformation function or the inverse deformation function, and the 2D or 3D data is employed to comprehensively analyze and learn the deformation during the 3D printing. The method of the present invention can be used as a universal method to directly, effectively and accurately perform error compensation in 3D printing.

BRIEF DESCRIPTION OF THE DRAWINGS

Other features, objectives and advantages of the present invention will be expressly described with reference to the non-restrictive embodiments and drawings.

DETAILED DESCRIPTION OF THE EMBODIMENTS

To make the objectives, technical solutions, and advantages of the present invention clearer, hereinafter, the technical solutions in the embodiments of the present invention will be clearly and completely described with reference to the drawings. Obviously, the described embodiments are a part of the embodiments of the present invention rather than all the embodiments. Based on the embodiments of the present invention, all other embodiments obtained by those having ordinary skill in the art without creative efforts shall fall within the scope of protection of the present invention.

The present invention will be further described in detail hereinafter with reference to the drawings and embodiments. It can be understood that the specific embodiments described herein are only intended to illustrate the present invention rather than to limit the present invention. In addition, only the parts related to the present invention are shown in the drawings for convenience of the description.

It should be noted that the embodiments in the present invention and the features in the embodiments can be combined with one another when not in conflict.

The main idea of the present invention is as follows.

Errors generated by additive manufacturing are predicted and compensated through combination with the neural network in the artificial intelligence field. The data are obtained by 3D scanning and other techniques. Then, by means of the neural network, the deformation function during 3D printing is learned and the compensation is completed, or the inverse deformation function is learned and the model is printed. By introducing this novel method, the requirements for hardware can be reduced, and the cost of printers with the same performance can be cut down, which has great practical significance and application value.

The present invention provides an end-to-end solution that connects the entire printing manufacturing process to form a closed loop while taking into account more comprehensive factors that affect printing precision. The shape data of the 3D object output by 3D printing obtained by scanning or simulation and other technologies are used as the printed model samples, and the corresponding 3D model data to be printed are used as the to-be-printed model samples, so as to construct the training sample set. The deformation network is constructed based on the deformation function by means of the neural network, and the deformation network is trained by the training sample set. Based on the trained deformation network, the printing output of the 3D model data to be printed is predicted to obtain the deformation data, and after the 3D model data to be printed are compensated, 3D printing is performed. Also, in the present invention, an inverse deformation network can be constructed based on the inverse deformation function, the printed model samples are used as the input, and the to-be-printed model samples are used as the output. The inverse deformation network constructed based on the inverse deformation function, after being trained, can directly use the model to be printed as the input of the neural network, and the output of the neural network is the corrected model, which can be directly achieved by printing.

In order to facilitate the description of the technical solution of the present invention, the deformation function and the inverse deformation function are described as follows. The 3D printing deformation function is a function representing a deformation relationship of the 3D printing device from the to-be-printed model to the printed model. The 3D printing inverse deformation function is a function representing an inverse deformation relationship of the 3D printing device from the model after being printed to the to-be-printed model.

In the neural network-based error compensation method for 3D printing of the present invention, the input model is predicted and compensated by the trained deformation network or inverse deformation network, and the 3D printing is performed based on the compensated model.

The deformation network or inverse deformation network is constructed according to the 3D printing deformation function or the 3D printing inverse deformation function, and the training samples of the deformation network or inverse deformation network include the to-be-printed model samples and the printed model samples during the 3D printing.

The deformation network constructed according to the 3D printing deformation function is marked as the first network. Output models obtained after the to-be-printed model samples in the training samples pass through the deformation network are used as expected output models. During training of the first network, the to-be-printed model samples are used as real input models, and the printed model samples are used as real output models.

The inverse deformation network constructed according to the 3D printing inverse deformation function is marked as a second network. Output models obtained after the printed model samples in the training samples pass through the inverse deformation network are used as expected output models. During training of the second network, the printed model samples are used as real input models, and the to-be-printed model samples are used as real output models.

It should be noted that, in the process of compensating the input model, only one of the first network and the second network is used in a preset manner or selective manner.

In the present invention, the loss function for training the deformation network or inverse deformation network is constructed based on the expected output model and the real output model in the training samples to assess the loss between the expected output and the real output. The loss function has a plurality of representations, and a preferred representation of the loss function L is provided in the present invention and is expressed by formula (1):

$$L = \sum_{i=0}^{M-1} [-ay_i \log(y'_i) - (1-a)(1-y_i)\log(1-y'_i)] \quad (1)$$

where, M denotes the number of voxels of the expected output model during training; a denotes a preset penalty coefficient, and $a \in [0,1]$; $y_i$ denotes a true probability that the $i^{th}$ voxel grid in the expected output model is occupied, and a value of $y_i$ is 0 or 1; $y'_i$ denotes a probability that the $i^{th}$ voxel grid is occupied, wherein the probability that the $i^{th}$ voxel grid is occupied is predicted by the neural network, and a value of $y'_i$ is between 0 and 1.

In order to more expressly describe the neural network-based error compensation method, system and device for 3D printing of the present invention, hereinafter, taking crowns tested by digital light processing (DLP) light-curing 3D printing as specific examples, the present invention is described in detail by the following embodiments. However, the solution of the present invention does not limit the printing process and the shape of the printed object, and thus can be applied and popularized in various 3D printing processes to print objects varying in shapes in practical applications.

Embodiment 1: The First Embodiment of the Neural Network-Based Error Compensation Method for 3D Printing In the present embodiment, the inverse deformation network is the neural network constructed based on the 3D printing inverse deformation function. The input model is compensated by the trained inverse deformation network based on the neural network to generate a compensated model, and the 3D printing is performed based on the compensated model. The inverse deformation network constructed by the inverse deformation function, after being trained, can directly use the model to be printed as the input, and the output is the corrected model, which can be printed directly.

The loss function L for training the inverse deformation network in the present embodiment is expressed by formula (1). The output models obtained after the printed model samples in the training samples pass through the inverse deformation network are used as the expected output models. In the present embodiment, during the training of the inverse deformation network, the printed model samples are used as the real input models, and the to-be-printed model samples are used as the real output models of the inverse deformation network.

Figure 1:
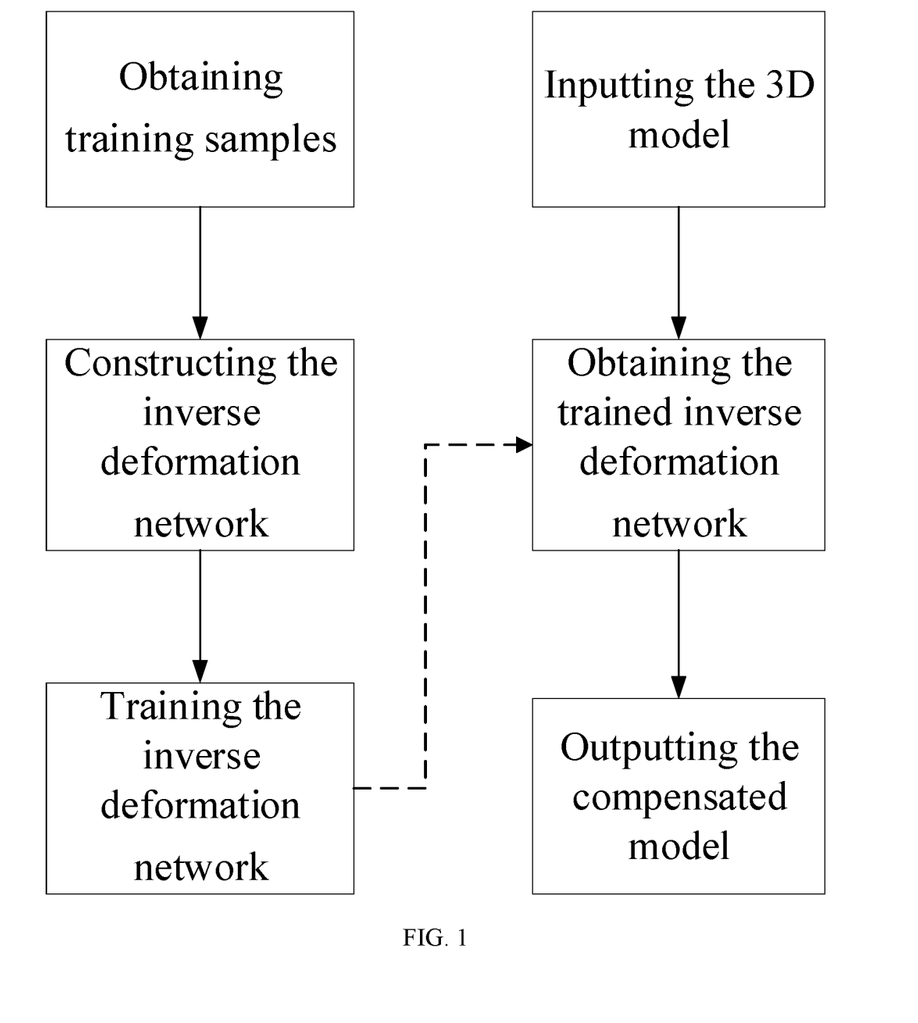
FIG. 1 is a schematic flow chart of the neural network-based error compensation method for 3D printing according to an embodiment of the present invention.
Figure 2A:
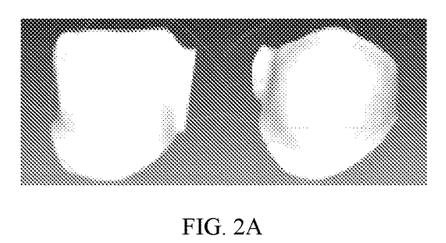
FIG. 2A schematically shows a 3D model of a single crown in standard tessellation language (STL) format, FIG. 2B schematically shows a 3D model of a bridge of multiple crowns in STL format, FIG. 2C schematically shows a voxelized 3D model of the single crown, and FIG. 2D schematically shows a voxelized 3D model of a bridge of multiple crowns.
Figure 2B:
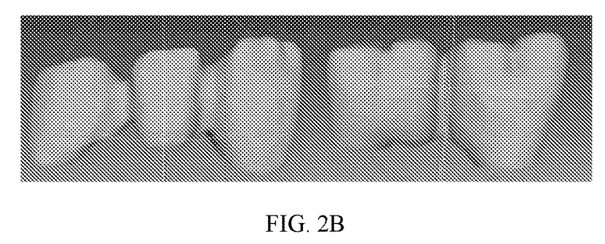
Figure 2C:
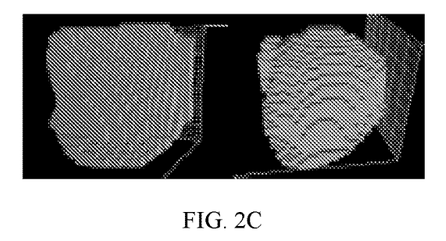
Figure 2D:
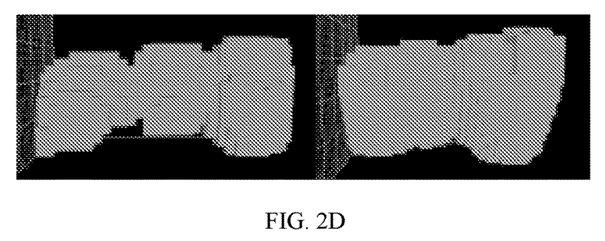

In order to explain the present embodiment more clearly, the present invention will be described in terms of the acquisition of training samples, the construction of the deformation network, the training of the inverse deformation network, and the selection of the inverse deformation network. FIG. 1 shows a schematic flow chart of the present embodiment, and the content related to the selection of the inverse deformation network is not contained in FIG. 1.

1. Acquisition of Training Samples

In the present embodiment, the input model sample in the training samples of the deformation network is a digital model obtained based on the 3D printed physical model, and the output model sample is the corresponding digital model to be printed. Only one specific acquisition method is provided below. This acquisition method is only used for the description of the technical solution, and cannot be construed as a limitation to the technical solution of the present invention.

(1) Printing. The model data to be printed are preprocessed by the model processing software before being printed. A plurality of model data is loaded into the software in batch mode to obtain a model to be printed, which can reduce the number of printings. The model data to be printed are loaded into the 3D printer for batch printing. After being printed, the 3D model is post-processed by manual operations including processes such as cleaning, curing and the like. Batch processing can be employed for a time-saving acquisition of the training sample data.

(2) Data acquisition. A data collection device is constructed, and a 3D scanner or other camera device is employed to obtain the printed 3D model data. Data acquisition can be achieved in many ways. For example, the printed model is removed and fixed on a fixed plane according to the direction and position that have been measured in advance. Then, the 3D scanner and other equipment are employed to perform scanning according to a predetermined path, which can avoid the interference of other factors on the data acquisition. In the present invention, only this method is illustrated. In practice, there are many ways to acquire 3D data. For example, pictures can be obtained by a plurality of fixed-direction cameras to synthesize the 3D data, which is not described in detail herein.

(3) 3D data processing, including denoising, threshold segmentation and others, is performed on the obtained 3D physical model data to remove the interference caused by scanning environment, and thus only the model is retained.

(4) Digitization of the model. The model is voxelized by the 3D model processing software. Digital processing for representing the model includes voxelization, gridding, point clouds and other methods. The model is expressed as a probability distribution with only binary variables including 0 and 1.

The voxelization method is taken as an example for a specific description without limiting the present invention, and specifically includes the following steps.

All output models are centered on the origin. First, the maximum length maxlength of the output model in the x, y, and z directions is calculated by formula (2) as follows:

$$\text{maxlength} = \max\{\max(x) - \min(x), \max(y) - \min(y), \max(z) - \min(z)\} \quad (2)$$

The voxel resolution resolution is set, and the length corresponding to each voxel unit is calculated by formula (3) as follows:

$$\text{length} = \text{maxlength}/\text{resolution} \quad (3)$$

The 3D model data is converted into a 3D voxel network by the 3D model processing software to express the 3D model as a probability distribution with binary variables on the 3D voxel grid. The binary variable 1 indicates that there is an element in the grid, and denotes the information about the crown. The binary variable 0 indicates that there is no element in the grid, and denotes the information about the background. FIG. 2A FIG. 2B, FIG. 2C and FIG. 2D form a comparison diagram showing the 3D model of the crown before and after being voxelized.

(5) Construction of the training samples. The training sample set contains a plurality of training samples. The input model sample of each training sample is a digital model obtained based on the 3D printed physical model, and the output model sample of each training sample is the corresponding digital model input into the printer.

In the present embodiment, a part of the obtained training samples is assigned to test samples in the subsequent testing process and verification samples for verifying the compensation effect.

2. Construction of the Inverse Deformation Network

A case regarding the neural network is described here. In practical applications, all neural network structures can be employed to train the inverse deformation function during printing. This case is only intended to explain the technical solution rather than to limit the present invention.

Figure 4:
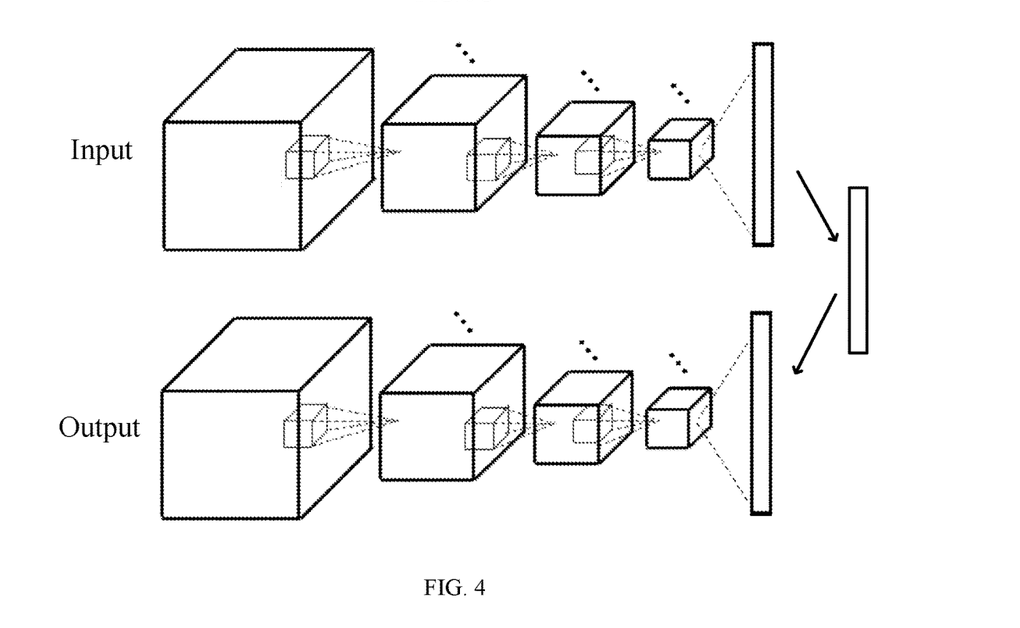
FIG. 4 is a schematic diagram showing the inverse deformation network constructed based on the inverse deformation function according to an embodiment of the present invention.

(1) The inverse deformation network is constructed based on the neural network according to the 3D printing inverse deformation function. The inverse deformation network includes an encoder and a decoder. The encoder has a three-layer structure, each layer includes a 3D convolutional layer and a maximum pooling layer with a step size of 2×2×2. Each convolutional layer is followed by a leaky rectified linear unit (LRELU) function. The encoder and the decoder are connected through a fully connected layer. The decoder also has a three-layer structure, and each layer includes a 3D deconvolution layer. The first two layers in the convolutional layers are followed by a rectified linear unit (ReLU), and the third layer in the convolutional layers is followed by a Sigmoid function. In this way, the output is limited within the range of (0, 1). As shown in FIG. 4, the input model (denoted by Input) successively passes through the network structures of the encoder and decoder to obtain the 3D model (denoted by Output) to be printed.

(2) The inverse deformation network employs an improved cross-entropy loss function. The nature of data is considered in the improved cross-entropy loss function. Most voxels in the voxelized data of the 3D model have a value of 0, so that the probability that the voxels identify 1 as 0 is high, and therefore a relatively high penalty coefficient a is assigned. In case that the voxels identify 0 as 1, a relatively low penalty coefficient (1−a) is assigned. If the expected output is set as y, and the real output (output model sample) is set as y', then for each voxel, the improved cross-entropy loss function L' is expressed by formula (4) as follows:

$$L'=-ay\log(y')-(1-a)(1-y)\log(1-y') \quad (4)$$

The loss function shown in formula (1) for training the inverse deformation network can be obtained according to formula (4).

3. Training of the Inverse Deformation Network (1) The data is read in. The input model sample in the training samples is used as the input model to be read into the inverse deformation network, and the output model sample is used as the real output model to be read into the neural network.

(2) The inverse deformation network is trained. In combination with the network structure of the inverse deformation network, the expected output model is obtained after the input model sample in the training samples passes through the inverse deformation network. The difference between the expected output model and the corresponding real output model (output model sample) is calculated, which determines the value of the loss function. The parameters of each layer of the inverse deformation network are adjusted according to the loss function L, and in this way, when the loss function reaches a minimum, the inverse deformation network can reach the approximate deformation with the highest precision, and the training ends.

4. Selection of the Inverse Deformation Network

Based on the set index system, in some embodiments, a method for selecting an optimal inverse deformation network from a plurality of inverse deformation networks for compensation in practical printing specifically includes the following steps.

Step S401, a plurality of the inverse deformation networks structured by the neural network is constructed.

Step S402, based on the preset loss function, the plurality of inverse deformation networks are trained, respectively, by the training method of the inverse deformation network in the present embodiment, to obtain a plurality of trained inverse deformation networks.

Step S403, based on the preset learning performance index set, learning performance index values of each trained inverse deformation network are obtained, respectively, to obtain a learning performance index value set of each of the trained inverse deformation networks.

Step S404, the learning performance index value set is selected, and a trained inverse deformation network corresponding to the learning performance index value set is used as the selected inverse deformation network. In this step, the inverse deformation network can be selected by setting the threshold of various indexes, or the optimal inverse deformation network can be selected by sorting the various indexes, which all can be automatically implemented by a computer, or by acquiring external selection instructions via a human-computer interaction device.

In the present embodiment, the "preset learning performance index set" is constructed based on variables of $TP_i$, $TN_i$, $FP_i$, and $FN_i$, wherein, i denotes the $i^{th}$ 3D model sample in the employed 3D model sample set. If the output is not less than the set threshold, the voxels of the expected output model are set as 1, otherwise set as 0. The 3D model sample described here can use a test sample.

In the present invention, the following parameters are defined to determine the effect of the inverse deformation network. N denotes the number of test model samples in the test model sample set. For the model $P_i$ (where, i=0, 1, ..., N−1), M denotes the number of voxels of the test model samples, then $TP_i$ denotes a true positive value of the $i^{th}$ 3D model sample, wherein the true positive value of the $i^{th}$ 3D model sample is equal to the number of voxels with a real output of 1 and an expected output of 1 in the 3D model sample.

$TN_i$ denotes a true negative value of the $i^{th}$ 3D model, wherein the true negative value of the $i^{th}$ 3D model sample is equal to the number of voxels with a real output of 0 and an expected output of 0 in the 3D model sample;

$FP_i$ denotes a false positive value of the $i^{th}$ 3D model, wherein the false positive value of the $i^{th}$ 3D model sample is equal to the number of voxels with the real output of 1 and the expected output of 0 in the 3D model sample;

$FN_i$ denotes a false negative value of the $i^{th}$ 3D model, wherein the false negative value of the $i^{th}$ 3D model sample is equal to the number of voxels with the real output of 0 and the expected output of 1 in the 3D model sample.

In the present invention, the "preset learning performance index set" includes at least one selected from the group consisting of Precision, Recall, F1, Accuracy, $Accuracy_i$, and $Accuracy_{i,white}$. In the present embodiment, the index calculation rule includes the above six indices to achieve an optimal selection result and is expressed by formulas (5)-(10).

$$\text{Precision} = \frac{\sum_{i=0}^{N-1} TP_i}{\sum_{i=0}^{N-1} TP_i + \sum_{i=0}^{N-1} FP_i} \quad (5)$$

$$\text{Recall} = \frac{\sum_{i=0}^{N-1} TP_i}{\sum_{i=0}^{N-1} TP_i + \sum_{i=0}^{N-1} FN_i} \quad (6)$$

$$F1 = \frac{2 \cdot \text{Precision} \cdot \text{Recall}}{\text{Precision} + \text{Recall}} = \frac{2 \cdot \sum_{i=0}^{N-1} TP_i}{2 \cdot \sum_{i=0}^{N-1} TP_i + \sum_{i=0}^{N-1} FN_i + \sum_{i=0}^{N-1} FP_i} \quad (7)$$

$$\text{Accuracy} = \frac{1}{M \cdot N} \sum_{i=0}^{N-1} (TP_i + TN_i) \quad (8)$$

$$\text{Accuracy}_i = \frac{1}{M}(TP_i + TN_i) \quad (9)$$

$$\text{Accuracy}_{i,white} = \frac{TP_i}{TP_i + FN_i} \quad (10)$$

where, Precision denotes precision and represents the ability of the inverse deformation network to distinguish the voxels inside the crown from the voxels outside the crown. The larger value of the precision, the better the network can separate the voxels in the crown. Recall denotes a recall rate, and the recall rate indicates the ability of the inverse deformation network to identify the voxels inside the crown. When the recall rate is large, the inverse deformation network can accurately identify more voxels inside the crown in each model. F1 denotes the harmonic mean of the precision and the recall rate. When the value of F1 increases, the performance of the network is improved. Accuracy denotes an accuracy rate showing the performance of correctly identifying voxel values in M voxels of N models. $\text{Accuracy}_i$ denotes an accuracy rate of the $i^{th}$ 3D model sample and represents the performance of correctly identifying voxels in the $i^{th}$ model. $\text{Accuracy}_{i,white}$ denotes an accuracy rate of voxels in the $i^{th}$ 3D model sample, and represents the performance of identifying the voxels inside the crown of the $i^{th}$ model. These values are used as indices to test the learning performance of the neural network, and the optimal inverse deformation network is selected based on these indices.

Embodiment 2: The Second Embodiment of the Neural Network-Based Error Compensation Method for 3D Printing The difference between the present embodiment and Embodiment 1 is as follows.

The deformation network is constructed based on the 3D printing deformation function. Output models obtained after the to-be-printed model samples in the training samples pass through the deformation network are used as the expected output models. In the present embodiment, during training of the deformation network, the to-be-printed model samples are used as the real input models, and the printed model samples are used as the real output models of the deformation network.

The input model sample of each training sample is the digital model to be printed, and the output model sample of each training sample is the corresponding digital model obtained based on the 3D printed physical model.

After the deformation network constructed by the deformation function is trained, the error compensation data of the model data to be printed is obtained. Before printing, it is necessary to compensate the model data to be printed through the human-computer interaction device. The human-computer interaction device here may be a computer equipment with an information entry function. After the error compensation data is obtained, the error compensation data is entered into the computer equipment to perform an error compensation on the model to be printed. The model to be printed is 3D printed after being compensated. The operation of entering the error compensation data into the computer equipment can be realized by an operator's manual operation. Optionally, other computer technologies can also be employed to simulate the error compensation data entry process of human-computer interaction.

Other contents of the present embodiment are identical to those in the first embodiment. For the convenience and conciseness of the description, the specific systematic working process and related description of the present embodiment can refer to the corresponding processes in the neural network-based error compensation method for 3D printing of the foregoing embodiment, which are not described in detail herein.

Embodiment 3: The Third Embodiment of the Neural Network-Based Error Compensation Method for 3D Printing The difference between the present embodiment and Embodiment 1 or Embodiment 2 is that the training samples of the deformation network or inverse deformation network are two-dimensional slice data of the 3D model.

Figure 3A:
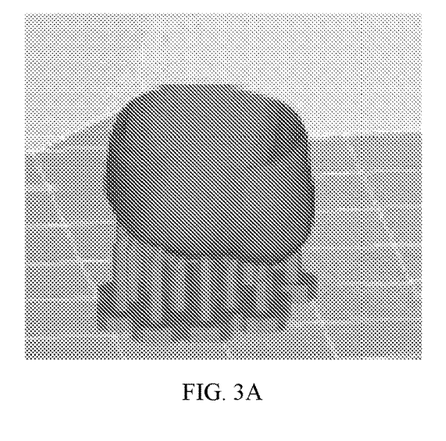
FIG. 3A, FIG. 3B and FIG. 3C schematically show a 3D model of the crown, a cross-sectional view of a layer of the 3D model of the crown and a two-dimensional image of the layer after being sliced, respectively.
Figure 3B:
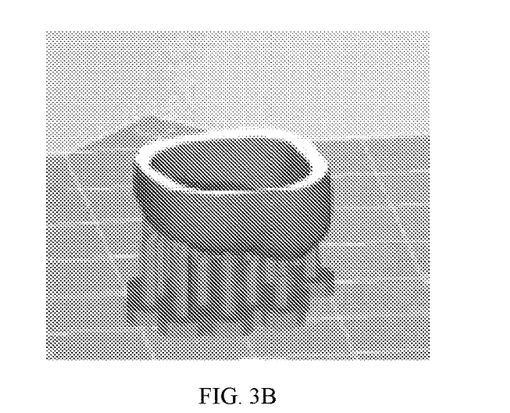
Figure 3C:
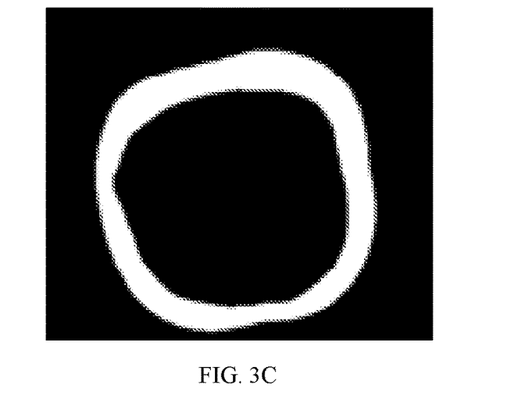

It is feasible to operate the two-dimensional data in that two-dimensional data can be obtained more easily compared with 3D data and is also available for compensating errors. Specifically, a slicing operation is performed on the 3D model in a direction that is horizontal to the model via the software to reduce the dimensionality of the 3D model. FIG. 3A, FIG. 3B and FIG. 3C show a 3D model of the crown, a cross-sectional view of a layer of the 3D model of the crown, and a two-dimensional image of the layer after being sliced, respectively.

Other contents of the present embodiment are identical to those in the foregoing embodiments. For the convenience and conciseness of the description, the specific systematic working process and related description of the present embodiment can refer to the corresponding processes in the error compensation method for 3D printing based on the neural network of the foregoing embodiments, which are not described in detail herein.

Embodiment 4: The Fourth Embodiment of the Neural Network-Based Error Compensation Method for 3D Printing The difference between the present embodiment and Embodiment 1 or Embodiment 2 is that the printed model samples in the training samples of the deformation network or inverse deformation network are generated based on the simulation method. The simulation method is performed without waiting for the practical printing process to quickly obtain the network structure with a good learning performance.

Taking the deformation function as an example, the deformation process of the 3D printing input model and the 3D printing output model is described by four conventional transformations including translation, scale down, scale up, and rotation. In practical applications, it is feasible to introduce other types of transformation relationships, or reduce one or more of these four conventional transformations.

The specific transformation relationship will be more clearly described by the following specific deformation examples via formulas. Specifically, (x, y, z) denotes coordinates before transformation (coordinates in the 3D printing input model), and (x', y', z') denotes coordinates after transformation (coordinates in the 3D printing output model).

(1) Translation: A translation by 0.5 (which is the translation compensation value) is performed on the 3D printing input model along the positive directions of x, y, and z axes, respectively. The 3D printing input model approximates the 3D solid surface by a series of small triangular patches. Each small triangular patch includes three points, and each point is denoted by 3D coordinates (x, y, z), then (x', y', z')=(x+0.5, y+0.5, z+0.5).

(2) Scale down: The origin is used as the center of the scale down of the 3D printing input model, a scaling by 0.9 (which is the scale down compensation factor) is performed on the 3D printing input model along the x, y, and z axes, respectively, then (x', y', z')=(x×0.9, y×0.9, z×0.9).

(3) Scale up: The origin is used as the center of the scale up of the 3D printing input model, a scaling by 1.1 (which is the scale up compensation factor) is performed on the 3D printing input model along the x, y, and z axes, respectively, then (x', y', z')=(x×1.1,y×1.1,z×1.1).

(4) Rotation: The origin is used as the center of the rotation of the 3D printing input model, and a rotation by 11.25° (which is the rotation compensation value) is performed on the 3D printing input model around the x-axis.

Other contents of the present embodiment are identical to those in the foregoing embodiments. For the convenience and conciseness of the description, the specific systematic working process and related description of the present invention can refer to the corresponding processes in the neural network-based error compensation method for 3D printing of the foregoing embodiments, which are not described in detail herein.

Embodiment 5: An Embodiment of the Neural Network-Based Error Compensation System for 3D Printing The system includes an input module, a compensation module and an output module.

The input module is configured to obtain the input model.

The compensation module includes a trained deformation network or inverse deformation network based on the neural network and is configured to compensate the input model to generate a compensated input model.

The output module is configured to output the compensated input model.

The deformation network or inverse deformation network is constructed according to the 3D printing deformation function or the 3D printing inverse deformation function. The training samples of the deformation network or inverse deformation network include to-be-printed model samples and printed model samples during the 3D printing.

The deformation network constructed according to the 3D printing deformation function is marked as the first network. Output models obtained after the to-be-printed model samples in the training samples pass through the deformation network are used as expected output models. During training of the first network, the to-be-printed model samples are used as real input models, and the printed model samples are used as real output models.

The inverse deformation network constructed according to the 3D printing inverse deformation function is marked as a second network. Output models obtained after the printed model samples in the training samples pass through the inverse deformation network are used as expected output models. During training of the second network, the printed model samples are used as the real input models, and the to-be-printed model samples are used as the real output models.

Those skilled in the art can clearly understand that, for the convenience and conciseness of the description, the specific working process and related description of the system of the present embodiment can refer to the corresponding process in the neural network-based error compensation method for 3D printing of the foregoing embodiments, which are not described in detail herein.

It should be noted that the neural network-based error compensation system for 3D printing provided by the foregoing embodiments is only exemplified by the division of the above-mentioned functional modules. In practical applications, the above-mentioned functions can be allocated to different functional modules according to needs, namely, the modules in the embodiments of the present invention are further decomposed or combined. For example, the modules in the foregoing embodiments may be combined into one module, or split into multiple sub-modules, to achieve all or part of the functions described above. The designations of the modules and steps involved in the embodiments of the present invention are only intended to distinguish these modules or steps, and cannot be construed as an improper limitation on the present invention.

Embodiment 6: An Embodiment of the Storage Device

In the present embodiment, a plurality of programs is stored in the storage device, and the plurality of programs are loaded and executed by the processor to achieve the neural network-based error compensation method for 3D printing described above.

Embodiment 7: An Embodiment of the Processing Device

In the present embodiment, the processing device includes a processor and a storage device. The processor is configured to execute a plurality of programs. The storage device is configured to store the plurality of programs. The plurality of programs are loaded and executed by the processor to achieve the neural network-based error compensation method for 3D printing described above.

Embodiment 8: An Embodiment of the 3D Printing Device

In the present embodiment, the 3D printing device includes a control unit. The control unit is configured to load and execute a plurality of programs to perform an error compensation on the input model by the neural network-based error compensation method for 3D printing described above during the 3D printing.

Those skilled in the art can clearly understand that, for the convenience and conciseness of the description, the specific working process and related description of Embodiments 6, 7, and 8 described above can refer to the corresponding process in the neural network-based error compensation method for 3D printing of the foregoing embodiments, which are not described in detail herein.

Those skilled in the art can realize that the modules, steps of methods described in the embodiments herein can be implemented by electronic hardware, computer software, or a combination of the electronic hardware and the computer software. The programs corresponding to modules of software, steps of methods can be stored in a random access memory (RAM), a memory, a read only memory (ROM), an electrically programmable ROM, an electrically erasable programmable ROM, a register, a hard disk, a removable disk, a compact disc-read only memory (CD-ROM) or any other form of storage mediums known in the technical field. In the above description, the compositions and steps of each embodiment have been generally described in terms of the functions to clearly explain the interchangeability of electronic hardware and software. Whether these functions are performed by electronic hardware or software depends on the specific application and designed constraint condition of the technical solution. Those skilled in the art can use different methods to implement the described functions for each specific application, but such implementation should not be considered to fall outside the scope of the present invention.

The terminologies "first", "second", and the like are used to distinguish similar subjects rather than to describe or indicate a specific order or sequence.

The terminology "include/comprise" and any other similar terminologies are used to cover non-exclusive inclusions, so that a process, method, article, equipment or device including a series of elements not only include these elements, but also include other elements that are not explicitly listed, or include elements inherent in the process, method, article, equipment or device.

Hereto, the technical solutions of the present invention have been described in combination with the preferred embodiments with reference to the drawings. However, it is easily understood by those skilled in the art that the scope of protection of the present invention is obviously not limited to these specific embodiments. Without departing from the principles of the present invention, those skilled in the art can make equivalent modifications or replacements to related technical features, and the technical solutions obtained by these modifications or replacements shall fall within the scope of protection of the present invention.

What is claimed is:

1. A neural network-based error compensation method for 3D printing, comprising:

compensating an input model by a deformation network or an inverse deformation network to obtain a compensated input model, and performing the 3D printing based on the compensated input model; wherein the deformation network is constructed and trained according to a 3D printing deformation function, and the inverse deformation network is constructed and trained according to a 3D printing inverse deformation function; training samples of the deformation network or the inverse deformation network comprise to-be-printed model samples and printed model samples during the 3D printing;

the deformation network constructed according to the 3D printing deformation function is marked as a first network; output models obtained after the to-be-printed model samples in the training samples pass through the deformation network are used as expected output models of the first network; during training of the first network, the to-be-printed model samples are used as real input models of the first network, and the printed model samples are used as real output models of the first network;

the inverse deformation network constructed according to the 3D printing inverse deformation function is marked as a second network; output models obtained after the printed model samples in the training samples pass through the inverse deformation network are used as expected output models of the second network; during training of the second network, the printed model samples are used as real input models of the second network, and the to-be-printed model samples are used as real output models of the second network; and the 3D printing deformation function is a function representing a deformation relationship of a 3D printing device from a to-be-printed model to a printed model; and the 3D printing inverse deformation function is a function representing an inverse deformation relationship of the 3D printing device from the printed model to the to-be-printed model.

2. The neural network-based error compensation method for the 3D printing according to claim 1, further comprising the following steps of selecting the deformation network/inverse deformation network:

constructing a plurality of deformation networks/inverse deformation networks structured by the neural network;

training the plurality of deformation networks/inverse deformation networks based on a preset loss function to obtain a plurality of trained deformation networks/inverse deformation networks;

based on a preset learning performance index set, obtaining learning performance index values of each trained deformation network/inverse deformation network of the plurality of trained deformation networks/inverse deformation networks, to obtain a learning performance index value set of each of the plurality of trained deformation networks/inverse deformation networks; and selecting the deformation network/inverse deformation network corresponding to the learning performance index value set.

3. The neural network-based error compensation method for the 3D printing according to claim 1, wherein, a loss function L for training the deformation network/inverse deformation network is expressed by the following formula:

$$L = \sum_{i=0}^{M-1}[-ay_i\log(y'_i) - (1-a)(1-y_i)\log(1-y'_i)]$$

wherein, M denotes a number of voxels of the expected output model during training of the deformation network/inverse deformation network; a denotes a preset penalty coefficient, and $a \in [0,1]$; $y_i$ denotes a true probability that an $i^{th}$ voxel grid in the expected output model is occupied; $y'_i$ denotes a probability that the $i^{th}$ voxel grid is occupied, wherein the probability that the $i^{th}$ voxel grid is occupied is predicted by the neural network.

4. The neural network-based error compensation method for the 3D printing according to claim 1, wherein, the training samples of the deformation network/inverse deformation network are 3D model data or two-dimensional slice data of 3D model samples.

5. The neural network-based error compensation method for the 3D printing according to claim 1, wherein, output model samples of the training samples of the deformation network/inverse deformation network are obtained based on a 3D printed physical model or generated based on a simulation method.

6. A storage device, wherein a plurality of programs are stored in the storage device, and the plurality of programs are loaded and executed by a processor to achieve the neural network-based error compensation method for the 3D printing according to claim 1.

7. A processing device, comprising a processor and a storage device; wherein the processor is configured to execute a plurality of programs; the storage device is configured to store the plurality of programs; the plurality of programs are loaded and executed by the processor to achieve the neural network-based error compensation method for the 3D printing according to claim 1.

8. A 3D printing device, comprising a control unit; wherein the control unit is configured to load and execute a plurality of programs to perform an error compensation on the input model by the neural network-based error compensation method for the 3D printing according to claim 1 during the 3D printing.

9. The neural network-based error compensation method for the 3D printing according to claim 2, wherein, the "preset learning performance index set" is constructed based on variables of $TP_i$, $TN_i$, $FP_i$, and $FN_i$, wherein, i denotes an $i^{th}$ 3D model sample in a 3D model sample set used in "the steps of selecting the deformation network/inverse deformation network";

$TP_i$ denotes a true positive value of the $i^{th}$ 3D model sample, wherein the true positive value of the $i^{th}$ 3D model sample is equal to a number of voxels with a real output of 1 and an expected output of 1 in the $i^{th}$ 3D model sample;

$TN_i$ denotes a true negative value of the $i^{th}$ 3D model sample, wherein the true negative value of the $i^{th}$ 3D model sample is equal to a number of voxels with a real output of 0 and an expected output of 0 in the $i^{th}$ 3D model sample;

$FP_i$ denotes a false positive value of the $i^{th}$ 3D model sample, wherein the false positive value of the $i^{th}$ 3D model sample is equal to a number of voxels with the real output of 1 and the expected output of 0 in the $i^{th}$ 3D model sample; and $FN_i$ denotes a false negative value of the $i^{th}$ 3D model sample, wherein the false negative value of the $i^{th}$ 3D model sample is equal to a number of voxels with the real output of 0 and the expected output of 1 in the $i^{th}$ 3D model sample.

10. The neural network-based error compensation method for the 3D printing according to claim 2, wherein, the training samples of the deformation network/inverse deformation network are 3D model data or two-dimensional slice data of 3D model samples.

11. The neural network-based error compensation method for the 3D printing according to claim 2, wherein, output model samples of the training samples of the deformation network/inverse deformation network are obtained based on a 3D printed physical model or generated based on a simulation method.

12. The neural network-based error compensation method for the 3D printing according to claim 9, wherein, the "preset learning performance index set" comprises at least one selected from the group consisting of Precision, Recall, F1, Accuracy, $Accuracy_i$, and $Accuracy_{i,white}$, wherein, $$Precision = \frac{\sum_{i=0}^{N-1} TP_i}{\sum_{i=0}^{N-1} TP_i + \sum_{i=0}^{N-1} FP_i}$$

$$Recall = \frac{\sum_{i=0}^{N-1} TP_i}{\sum_{i=0}^{N-1} TP_i + \sum_{i=0}^{N-1} FN_i}$$

$$F1 = \frac{2 \cdot Precision \cdot Recall}{Precision + Recall} = \frac{2 \cdot \sum_{i=0}^{N-1} TP_i}{2 \cdot \sum_{i=0}^{N-1} TP_i + \sum_{i=0}^{N-1} FN_i + \sum_{i=0}^{N-1} FP_i}$$

$$Accuracy = \frac{1}{M \cdot N} \sum_{i=0}^{N-1} (TP_i + TN_i)$$

$$Accuracy_i = \frac{1}{M}(TP_i + TN_i)$$

$$Accuracy_{i,white} = \frac{TP_i}{TP_i + FN_i}$$

and wherein, Precision denotes a precision, Recall denotes a recall rate, F1 denotes a harmonic mean of the precision and the recall rate, Accuracy denotes an accuracy rate, $Accuracy_i$ denotes an accuracy rate of the $i^{th}$ 3D model sample, $Accuracy_{i,white}$ denotes an accuracy rate of voxels in the $i^{th}$ 3D model sample, N denotes a number of 3D model samples in the 3D model sample set, and M denotes a number of voxels in the 3D model samples.

13. The neural network-based error compensation method for the 3D printing according to claim 9, wherein, the training samples of the deformation network/inverse deformation network are 3D model data or two-dimensional slice data of 3D model samples.

14. The neural network-based error compensation method for the 3D printing according to claim 9, wherein, output model samples of the training samples of the deformation network/inverse deformation network are obtained based on a 3D printed physical model or generated based on a simulation method.

15. The neural network-based error compensation method for the 3D printing according to claim 12, wherein, the training samples of the deformation network/inverse deformation network are 3D model data or two-dimensional slice data of the 3D model samples.

16. The neural network-based error compensation method for the 3D printing according to claim 12, wherein, output model samples of the training samples of the deformation network/inverse deformation network are obtained based on a 3D printed physical model or generated based on a simulation method.

17. The storage device according to claim 6, wherein, the neural network-based error compensation method for the 3D printing further comprises the following steps of selecting the deformation network/inverse deformation network:
constructing a plurality of deformation networks/inverse deformation networks structured by the neural network;
training the plurality of deformation networks/inverse deformation networks based on a preset loss function to obtain a plurality of trained deformation networks/inverse deformation networks;
based on a preset learning performance index set, obtaining learning performance index values of each trained deformation network/inverse deformation network of the plurality of trained deformation networks/inverse deformation networks, to obtain a learning performance index value set of each of the plurality of trained deformation networks/inverse deformation networks; and
selecting the deformation network/inverse deformation network corresponding to the learning performance index value set.

18. The storage device according to claim 17, wherein, the "preset learning performance index set" is constructed based on variables of $TP_i$, $TN_i$, $FP_i$, and $FN_i$, wherein, i denotes an $i^{th}$ 3D model sample in a 3D model sample set used in "the steps of selecting the deformation network/inverse deformation network";
$TP_i$ denotes a true positive value of the $i^{th}$ 3D model sample, wherein the true positive value of the $i^{th}$ 3D model sample is equal to a number of voxels with a real output of 1 and an expected output of 1 in the $i^{th}$ 3D model sample;
$TN_i$ denotes a true negative value of the $i^{th}$ 3D model sample, wherein the true negative value of the $i^{th}$ 3D model sample is equal to a number of voxels with a real output of 0 and an expected output of 0 in the $i^{th}$ 3D model sample;
$FP_i$ denotes a false positive value of the $i^{th}$ 3D model sample, wherein the false positive value of the $i^{th}$ 3D model sample is equal to a number of voxels with the real output of 1 and the expected output of 0 in the $i^{th}$ 3D model sample; and
$FN_i$ denotes a false negative value of the $i^{th}$ 3D model sample, wherein the false negative value of the $i^{th}$ 3D model sample is equal to a number of voxels with the real output of 0 and the expected output of 1 in the $i^{th}$ 3D model sample.

19. The storage device according to claim 18, wherein, the "preset learning performance index set" comprises at least one selected from the group consisting of Precision, Recall, F1, Accuracy, $Accuracy_i$, and $Accuracy_{i,white}$, wherein, $$Precision = \frac{\sum_{i=0}^{N-1} TP_i}{\sum_{i=0}^{N-1} TP_i + \sum_{i=0}^{N-1} FP_i}$$

$$Recall = \frac{\sum_{i=0}^{N-1} TP_i}{\sum_{i=0}^{N-1} TP_i + \sum_{i=0}^{N-1} FN_i}$$

$$F1 = \frac{2 \cdot Precision \cdot Recall}{Precision + Recall} = \frac{2 \cdot \sum_{i=0}^{N-1} TP_i}{2 \cdot \sum_{i=0}^{N-1} TP_i + \sum_{i=0}^{N-1} FN_i + \sum_{i=0}^{N-1} FP_i}$$

$$Accuracy = \frac{1}{M \cdot N} \sum_{i=0}^{N-1} (TP_i + TN_i)$$

$$Accuracy_i = \frac{1}{M}(TP_i + TN_i)$$

$$Accuracy_{i,white} = \frac{TP_i}{TP_i + FN_i}$$

and wherein, Precision denotes a precision, Recall denotes a recall rate, F1 denotes a harmonic mean of the precision and the recall rate, Accuracy denotes an accuracy rate, $Accuracy_i$ denotes an accuracy rate of the $i^{th}$ 3D model sample, $Accuracy_{i,white}$ denotes an accuracy rate of voxels in the $i^{th}$ 3D model sample, N denotes a number of 3D model samples in the 3D model sample set, and M denotes a number of voxels in the 3D model samples.

20. A neural network-based error compensation system for 3D printing, comprising:
an input module,
a compensation module, and
an output module;
wherein
the input module is configured to obtain an input model;
the compensation module is configured to compensate the input model based on a deformation network or an inverse deformation network based on the neural network to generate a compensated input model;
the output module is configured to output the compensated input model;
the deformation network is constructed and trained according to a 3D printing deformation function, and the inverse deformation network is constructed and trained according to a 3D printing inverse deformation function; training samples of the deformation network or the inverse deformation network comprise to-be-printed model samples and printed model samples during the 3D printing;
the deformation network constructed according to the 3D printing deformation function is marked as a first network; output models obtained after the to-be-printed model samples in the training samples pass through the deformation network are used as expected output models of the first network; during training of the first network, the to-be-printed model samples are used as real input models of the first network, and the printed model samples are used as real output models of the first network;
the inverse deformation network constructed according to the 3D printing inverse deformation function is marked as a second network; output models obtained after the printed model samples in the training samples pass through the inverse deformation network are used as expected output models of the second network; during training of the second network, the printed model samples are used as real input models of the second network, and the to-be-printed model samples are used as real output models of the second network; and the 3D printing deformation function is a function representing a deformation relationship of a 3D printing device from a to-be-printed model to a printed model; and the 3D printing inverse deformation function is a function representing an inverse deformation relationship of the 3D printing device from the printed model to the to-be-printed model.

\* \* \* \* \*